(12) United States Patent
Suzunaga et al.

(10) Patent No.: US 7,227,118 B2
(45) Date of Patent: Jun. 5, 2007

(54) LIGHT-EMITTING ELEMENT DRIVING CIRCUIT HAVING A SWITCHING UNIT WITH A DIODE

(75) Inventors: Hiroshi Suzunaga, Kawasaki (JP);
Atsushi Namai, Kawasaki (JP);
Hirofumi Kobayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 568 days.

(21) Appl. No.: 10/873,302

(22) Filed: Jun. 23, 2004

(65) Prior Publication Data
US 2005/0218835 A1    Oct. 6, 2005

(30) Foreign Application Priority Data
Apr. 5, 2004 (JP) .............................. 2004-111323

(51) Int. Cl.
*H01J 40/14* (2006.01)
(52) U.S. Cl. .................................. 250/214 R; 250/205
(58) Field of Classification Search ............ 250/214 R, 250/214.1, 205, 208.1
See application file for complete search history.

(56) References Cited

U.S. PATENT DOCUMENTS

| 4,806,803 | A | 2/1989 | Yamashita |
| 5,430,749 | A | 7/1995 | Horie |
| 6,898,090 | B2 * | 5/2005 | Nishida et al. ............... 363/19 |

FOREIGN PATENT DOCUMENTS

JP    2000-232240    8/2000

* cited by examiner

*Primary Examiner*—Que T. Le
(74) *Attorney, Agent, or Firm*—Oblon, Spivak, McClelland, Maier & Neustadt, P.C.

(57) ABSTRACT

A light-emitting element driving circuit comprises a current supplier serially connected to a light-emitting element and operative to supply a current to the light-emitting element; and a switching unit operative to control switching between the states of the current supplied to the light-emitting element from the current supplier. The switching unit includes a current path consisting of a diode and a semiconductor switching element. The diode is connected in parallel with the light-emitting element and in a forward direction directed from an anode to a cathode of the light-emitting element. The semiconductor switching element is connected serially to the diode and operative to switch between the states of conductive and non-conductive based on a control signal. A voltage drop across the current path when the semiconductor switching element is made conductive is determined lower than a forward voltage of the light-emitting element when it emits light.

17 Claims, 8 Drawing Sheets

LIGHT-EMITTING ELEMENT DRIVING CIRCUIT HAVING A SWITCHING UNIT WITH A DIODE

CROSS-REFERENCE TO PRIOR APPLICATION

This application is based upon and claims the benefit of priority from the prior Japanese Patent Application No. 2004-111323, filed on Apr. 5, 2004, the entire content of which is incorporated herein by reference.

BACKGROUND OF THE INVENTION

1. Field of the Invention

The present invention relates to a light-emitting element driving circuit for use in driving a light-emitting element such as an LED.

2. Description of the Related Art

Figure 12:
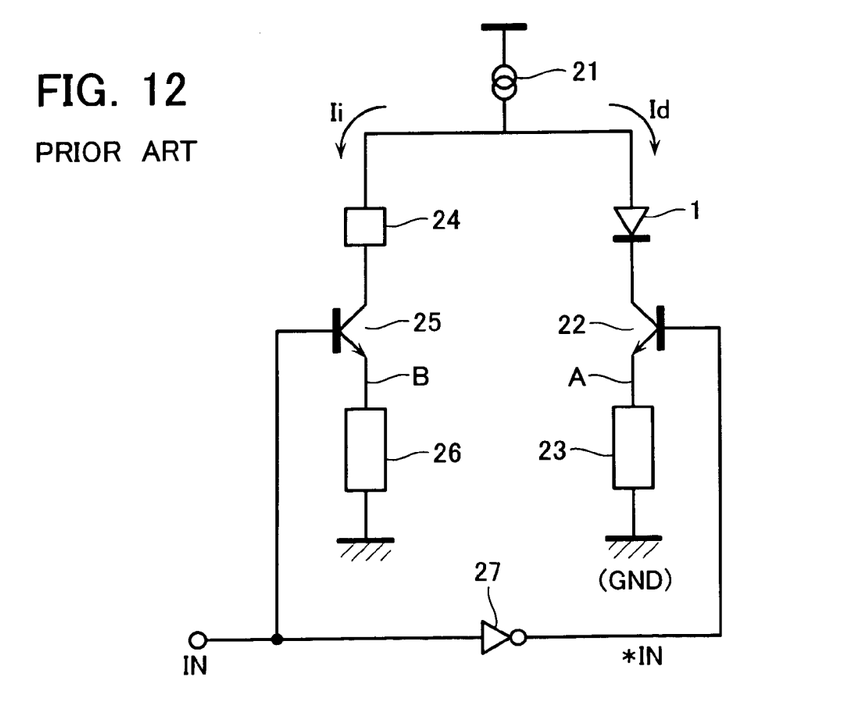
FIG. 12 shows a configuration of a light-emitting element driving circuit according to a first example of the prior art.

FIG. 12 shows an exemplary known light-emitting element driving circuit for driving semiconductor light-emitting elements such as an LED (JP-A 7-154015).

In this driving circuit, a driven LED 1 receives a drive current supplied from a constant current source 21. Between a cathode of the LED 1 serving as the light-emitting element and a ground terminal (GND), a switching element 22 and a resistor 23 are connected in this order to form a current path A. In parallel with the current path A, on the other hand, a resistor 24, a switching element 25 and a resistor 26 are connected serially to form a current path B. The switching element 25 is controlled on/off based on an input signal IN as a control signal. To the contrary, the switching element 22 is controlled on/off based on an inverted signal *IN of the input signal IN from an inverter 27. In a word, the switching elements 22 and 25 are differentially controlled on/off.

In this configuration, when the input signal IN is set "Low", the switching element 22 is turned on and the switching element 25 is turned off. As a result, a drive current Id flows in the LED 1 and a current Ii flowing in the current path B turns to zero, resulting in emission of light from the LED 1. On the other hand, when the input signal IN is set "Hi", the switching element 22 is turned off and the switching element 25 is turned on. As a result, the current Ii flows in the current path B and the drive current Id turns to zero, resulting in elimination of light from the LED 1.

The circuit of JP-A 7-154015 requires a semiconductor switching element each in the current path A containing the LED 1 as the light-emitting element and in the current path B as the switching unit.

Figure 13:
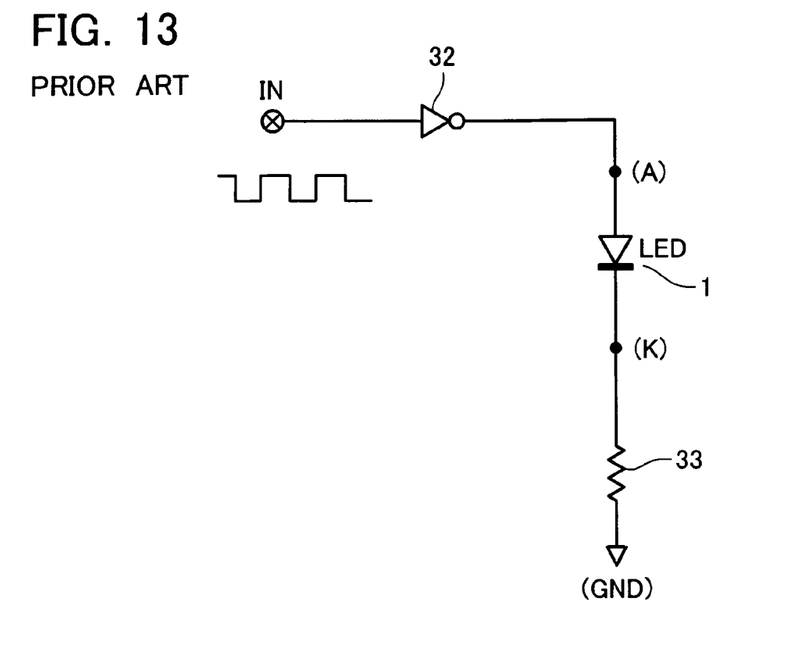
FIG. 13 shows a configuration of a light-emitting element driving circuit according to a second example of the prior art.

FIG. 13 shows another example of the circuit for driving semiconductor light-emitting elements known in the art. In this case, an inverter 32 is employed as a driver element and its output terminal is connected to the anode (A) of the LED 1. A resister 33 is connected between the cathode (K) of the LED 1 and the ground terminal (GND). The resister 33 is employed to set a value of the forward current If flowing in the LED 1.

This driving circuit has an advantage over JP-A 7-154015 because of no requirement of switching elements though it has the following problem. Namely, control of elimination/emission of light from the LED 1 requires the anode-cathode potential to fluctuate between 0-2V. This fluctuation requires a certain time to charge and discharge a parasitic capacitance such as a junction capacitance of the LED 1 and causes a problem because the LED 1 can not be driven fast.

In consideration of this problem, a driving circuit has been proposed to suppress the fluctuation of the anode potential to drive the LED 1 quickly (see JP-A 12-232240, for example).

Figure 14:
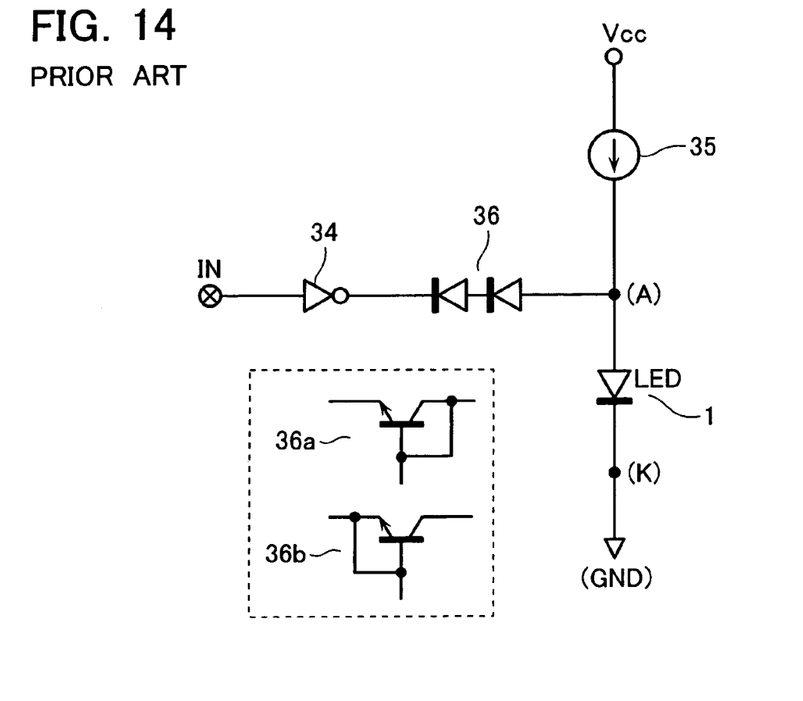
FIG. 14 shows a configuration of a light-emitting element driving circuit according to a third example of the prior art.

FIG. 14 shows the driving circuit disclosed in this patent publication 2. In this case, the cathode (K) of the LED 1 is grounded. A current source 35 is connected between the supply voltage (Vcc) and the anode (A) of the LED 1. An inverter 34 is provided as a driver element to switch supply of current to the LED 1. The logic of the input signal IN fed from the input terminal of the inverter 34 is changed to switch the LED 1 on/off. Between the output terminal of the inverter 34 and the anode (A) of the LED 1, a diode 36 is connected in a forward direction directed from the anode (A) to the output terminal of the inverter 34.

In this driving circuit, for emission of light from the LED 1, the input signal IN is made "Low" to turn the output signal from the inverter 34 to "Hi". If the supply voltage is equal to 5 V, the output signal from the inverter 34 is also equal to approximately 5 V and thus a reverse voltage is applied across the diode 36. Accordingly, the current is supplied from the current source 35 not to the diode 36 but to the LED 1, which emits light.

On the other hand, for elimination of light from the LED 1, the input signal IN is made "Hi" to turn the output signal from the inverter 34 to "Low". In this case, a forward voltage is applied across the diode 36. Accordingly, the current is supplied from the current source 35 to the diode 36 and drained into the output terminal of the inverter 34. As a result, any current is not supplied to the LED 1, which turns off. While the LED 1 turns off, the anode potential of the LED 1 is kept equal to the forward voltage of the diode 36. For example, if the diode 36 consists of two serially connected diode elements each having a forward voltage of 0.8 V as shown in FIG. 14, the anode potential on the LED 1 comes to 2×0.8=1.6 V. Therefore, if the anode potential is equal to 2.0 V when the LED 1 turns on, for example, the anode potential on the LED 1 may fluctuate between 1.6–2.0 V. Accordingly, the fluctuation width can be reduced greatly over the driving circuit of FIG. 13. Thus, the time required to charge and discharge the LED 1 can be shortened to achieve high-speed driving.

Figure 15:
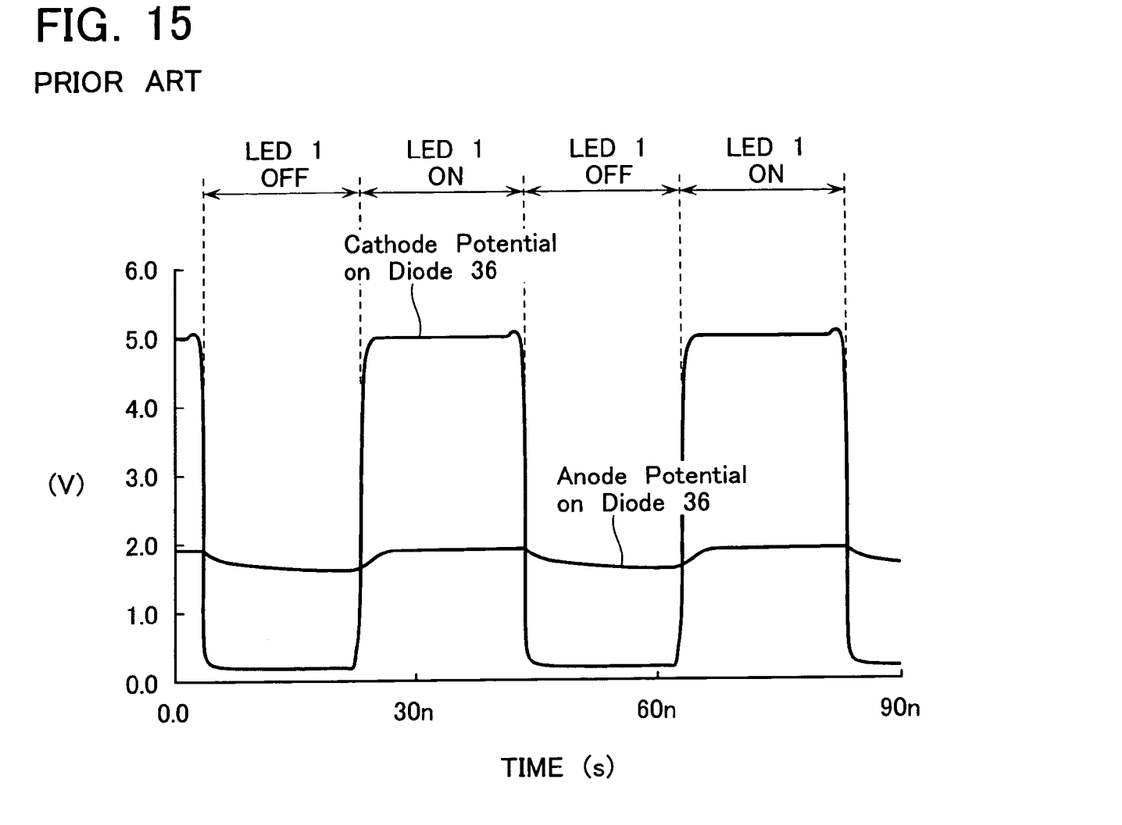
FIG. 15 is a graph showing operation of the light-emitting element driving circuit according to the third example of the prior art (variations in voltage).

In the driving circuit of FIG. 14, the anode potential on the LED 1 is controlled to have a small fluctuation width. Though, there is a problem because a large fluctuation of the cathode potential on the diode 36 causes the reverse voltage to exceed the breakdown voltage of the diode 36, resulting in device destruction possibly. Namely, in the driving circuit of FIG. 14, when the input signal IN to the inverter 34 is "Hi" and the output signal therefrom is "Low" (the LED 1 turns off in this case), the cathode potential on the diode 36 is almost equal to zero. On the other hand, the anode potential on the diode 36 is almost equal to the forward voltage of the diode 36, that is, 1.6 [V] (see FIG. 15). Therefore, no problem occurs because the forward voltage is applied across the diode 36. To the contrary, when the input signal IN to the inverter 34 is "Low" and the output signal therefrom is "Hi" (the LED 1 turns on in this case), the cathode potential on the diode 36 is almost equal to 5 [V]. On the other hand, the anode potential on the diode 36 is almost equal to the forward voltage of the LED 1, that is, 2 [V] (see FIG. 15). Therefore, a reverse voltage up to approximately 3 [V] is applied across the diode 36.

When such the driving circuit is fabricated in an integrated circuit, the diode 36 may be composed of a collector-base short-circuited bipolar npn transistor 36a. In structure, the diode 36 composed of the collector-base short-circuited bipolar npn transistor 36a has a higher band though it has a lower breakdown voltage against the reverse voltage, which is hardly elevated up to 3 [V]. The diode 36 may be composed of a base-emitter short-circuited bipolar npn transistor 36b to improve the breakdown voltage against the reverse voltage. Though, it has a problem because of a larger capacitance and a lower band. The diode 36 composed of the base-emitter short-circuited bipolar npn transistor 36b may cause disadvantageous leakage of current into the substrate depending on the structure.

SUMMARY OF THE INVENTION

The present invention provides a light-emitting element driving circuit. It comprises a current supplier serially connected to a light-emitting element and operative to supply a current to the light-emitting element; and a switching unit operative to control switching between the states of the current supplied to the light-emitting element from the current supplier. The switching unit includes a current path consisting of a diode and a semiconductor switching element. The diode is connected in parallel with the light-emitting element and in a forward direction directed from an anode to a cathode of the light-emitting element. The semiconductor switching element is connected serially to the diode and operative to switch between the states of conductive and non-conductive based on a control signal. A voltage drop across the current path when the semiconductor switching element is made conductive is determined lower than a forward voltage of the light-emitting element when it emits light.

DETAILED DESCRIPTION OF THE PREFERRED EMBODIMENTS

A first embodiment of the present invention will now be described with reference to the drawings, in which the same elements as those in the prior art are given the same reference numerals and omitted from the following detailed description.

Figure 1:
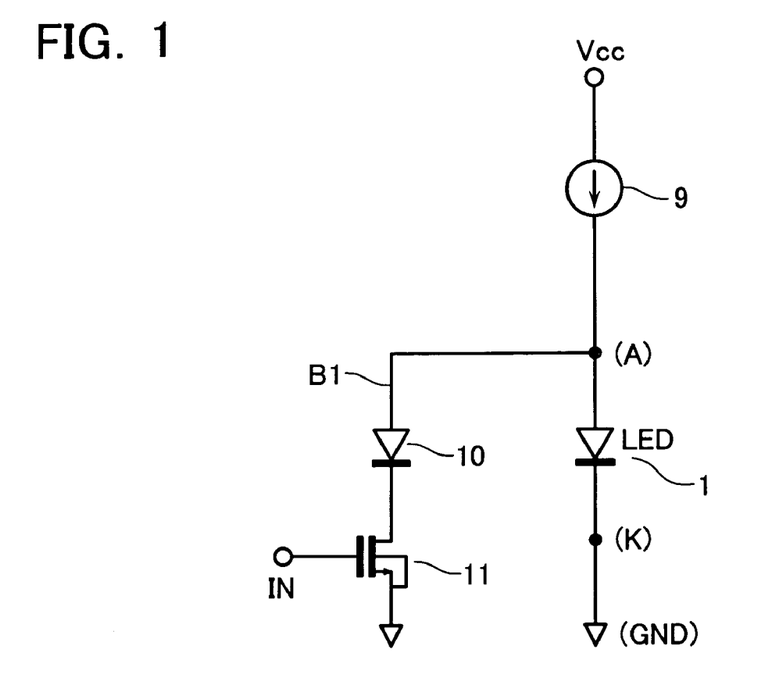
FIG. 1 shows a configuration of a light-emitting element driving circuit according to a first embodiment of the present invention.

FIG. 1 shows a light-emitting element driving circuit according to the first embodiment of the present invention. In the circuit of FIG. 1, an LED 1 serving as a light-emitting element has an anode (A) connected via a constant current source 9 to a supply voltage Vcc, and a cathode (K) connected to the ground terminal GND. A diode 10 and an NMOS transistor 11 serving as a semiconductor switching element are connected to the anode (A) of the LED 1. The diode 10 is connected in a forward direction directed from the constant current source 9 to the NMOS transistor 11.

The NMOS transistor 11 is switched between the states of conductive and non-conductive using a control signal input to the gate thereof. The diode 10 and the NMOS transistor 11 configure a current path B1 in a switching unit. A voltage drop across the whole current path B1 is determined lower than a forward voltage Vf of the LED 1 when it emits light. This situation is achieved herein by determining Vf equal to 2.0 [V] and a forward voltage of the diode 10 equal to 1.6 [V]. (A voltage drop across the NMOS transistor 11 when it is conductive is neglected herein). In the light-emitting element driving circuit of this embodiment, the diode 10 and the LED 1 may be composed of the same material.

Figure 2:
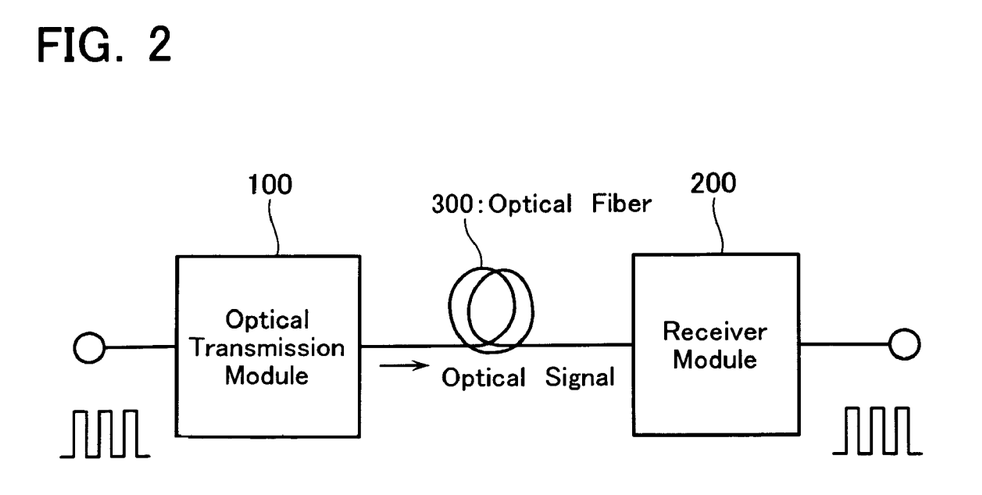
FIG. 2 shows a configuration of an optical transmission system that may include the light-emitting element driving circuit of the present invention applied thereto.

The light-emitting element driving circuit according to the embodiment of the present invention may be applied to an optical transmission system, in which an optical transmission module 100 is coupled to a receiver module 200 via an optical fiber 300 as shown in FIG. 2. The optical transmission module 100 converts an input electric signal to an optical signal. The converted optical signal is transmitted through the optical fiber 300 and recovered to the electric signal at the receiver module 200. The light-emitting element driving circuit shown in FIG. 1 may be applied to the optical transmission module 100.

Figure 3:
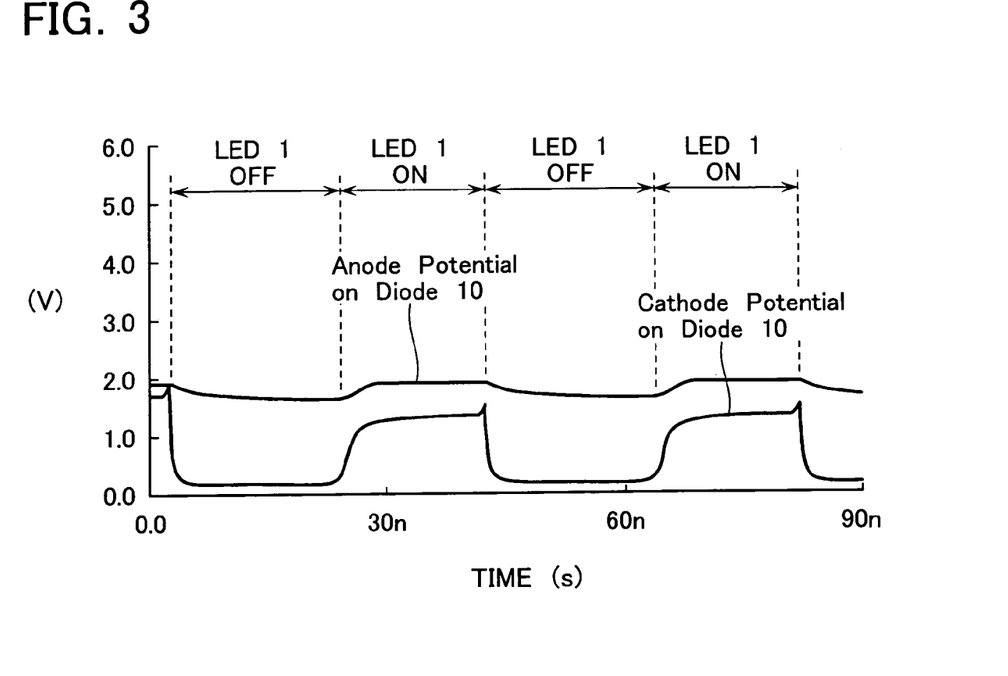
FIG. 3 is a graph showing operation of the light-emitting element driving circuit according to the first embodiment (variations in voltage)
Figure 4:
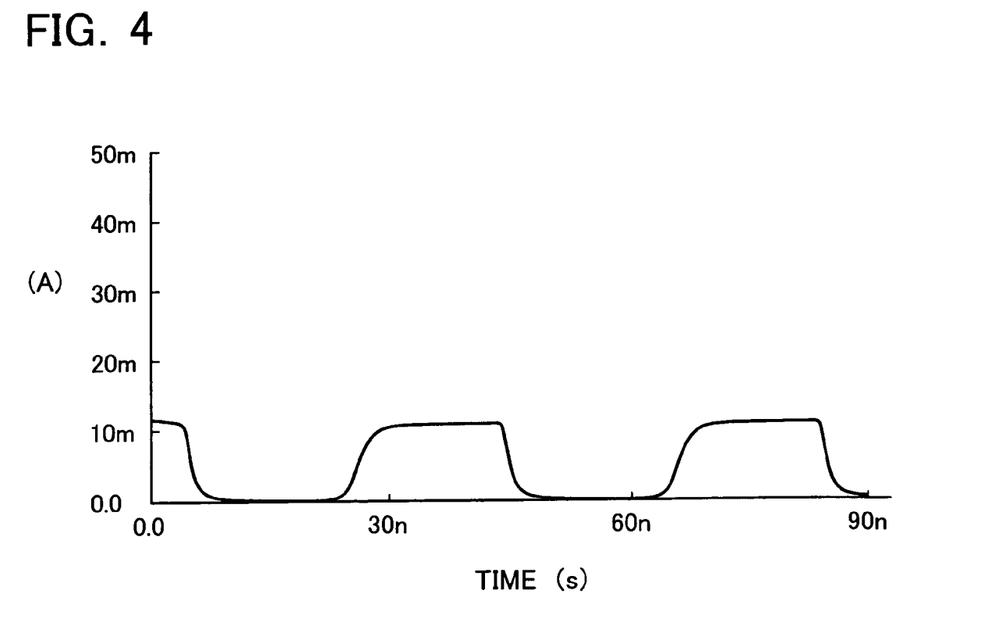
FIG. 4 is a graph showing operation of the light-emitting element driving circuit according to the first embodiment (variations in current)

Operation of the light-emitting element driving circuit shown in FIG. 1 will be described next with reference to FIGS. 3 and 4. FIG. 3 is a graph showing variations in potentials on the anode and the cathode of the diode 10. FIG. 4 is a graph showing variations in current flowing in the LED 1.

When the input signal IN is set "Low" to make the NMOS transistor 11 non-conductive, the current from the constant current source 9 flows toward the LED 1, which emits light. In this case, the anode potential on the diode 10 comes equal to the forward voltage Vf of the LED 1 emitting light, that is, approximately 2.0 [V]. On the other hand, the cathode of the diode 10 is floating if the NMOS transistor 11 is ideal, and the anode potential should be equal to the cathode potential. Actually, however, the cathode potential of the diode 10 has a slightly lower value than the anode potential due to leakage current and transient current associated with the diode 10 and the NMOS transistor 11.

When the input signal IN is set "Hi" to make the NMOS transistor 11 conductive, the current from the constant current source 9 flows in the current path B1, that is, the diode 10 and the NMOS transistor 11. As the voltage drop across the whole current path B1 is determined smaller than the forward voltage Vf of the LED 1 emitting light, the LED 1 turns off. In this case, the anode potential on the diode 10 comes equal to approximately 1.6 [V] and the cathode potential comes almost equal to zero. Thus, in this embodiment, either when the LED 1 emits light or when it turns off, the forward voltage is applied across the diode 10. Therefore, it is possible to prevent such the situation that the reverse voltage over the breakdown voltage is applied across the diode, which occurs in the light-emitting element driving circuit of FIG. 14 according to the prior art. On the other hand, in this embodiment, the anode potential on the diode 10 fluctuates within a small fluctuation width such as 1.6–2.0 [V] as shown in FIG. 3. Accordingly, the LED 1 can be driven fast like the driving circuit shown in FIG. 14 does.

Figure 5:
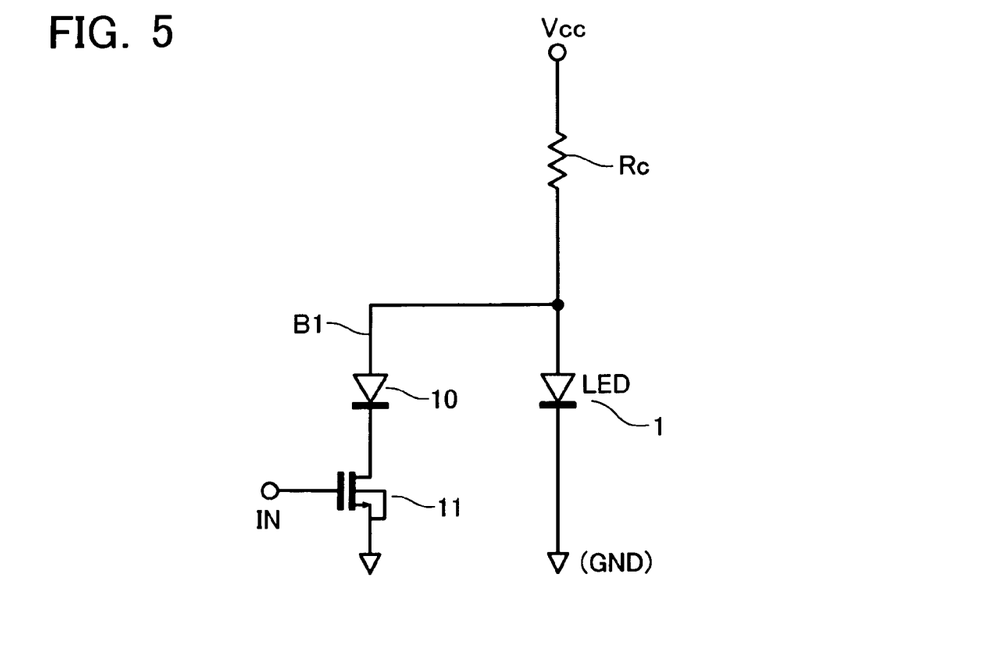
FIG. 5 shows an alternative of the first embodiment.

In the first embodiment, the constant current source 9 is employed as a means for supplying current to the LED 1. In contrast, instead of the constant current source, a resistor Rc may be connected between the supply voltage Vcc and the anode of the LED 1 as shown in FIG. 5. In this case, the resistor Rc and the supply voltage Vcc determine a current that is supplied to the LED 1. In FIG. 1, instead of the NMOS transistor 11, a PMOS transistor, not shown, may be employed as a switching element.

A light-emitting element driving circuit according to a second embodiment of the present invention is described with reference to FIG. 6, in which the same parts as those in FIG. 1 are given the same reference numerals and omitted from the detailed description. The second embodiment differs from the first embodiment in the use of a peaking circuit 13 consisting of an inverter 12, a capacitor C3 and a resistor R3, which is connected between the terminal for the input signal IN and the anode of the diode 10. When the input signal IN is set "Hi" to turn the output signal from the inverter 12 to "Low", the NMOS transistor 11 is made conductive. In this state, the peaking circuit 13 is connected in substantially parallel with the current path B1.

Operation of the light-emitting element driving circuit of the second embodiment is described below.

When the input signal IN to the inverter 12 is turned from "Hi" to "Low" (the output signal is changed from "Low" to "Hi") to make the NMOS transistor 11 from conductive to non-conductive, the current from the constant current source 9 flows in the LED 1. Accordingly, the LED 1 transfers the state from light elimination to light emission. In this case, the charge accumulated in the capacitor C3 of the peaking circuit 13 is discharged toward the anode of the LED 1. As a result, a peaking current having a waveform of the signal output from the inverter 12 and differentiated flows for a certain period of time and is superimposed on the current from the constant current source 9 (FIG. 7). Thus, the LED 1 can be over driven to switch the state from light elimination to light emission more quickly than the first embodiment.

On the other hand, when the input signal IN to the inverter 12 is turned from "Low" to "Hi" (the output signal is changed from "Hi" to "Low") while the LED 1 emits light, the NMOS transistor 11 is turned from non-conductive to conductive. In this case, the current from the constant current source 9 flows in the current path B1, that is, the diode 10 and the NMOS transistor 11 to change the state of the LED 1 from light emission to light elimination.

After the LED 1 changes the state from light emission to light elimination, the internal charge accumulated in the capacitance of the LED 1 and the current from the constant current source 9 are drained in the capacitor C3 of the peaking circuit 13. As a result, a negative peaking current having a waveform of the signal output from the inverter 12 and differentiated flows to achieve an improved current drain time (FIG. 7). Thus, the LED 1 can be over driven to switch the state from light emission to light elimination quickly.

Figure 6:
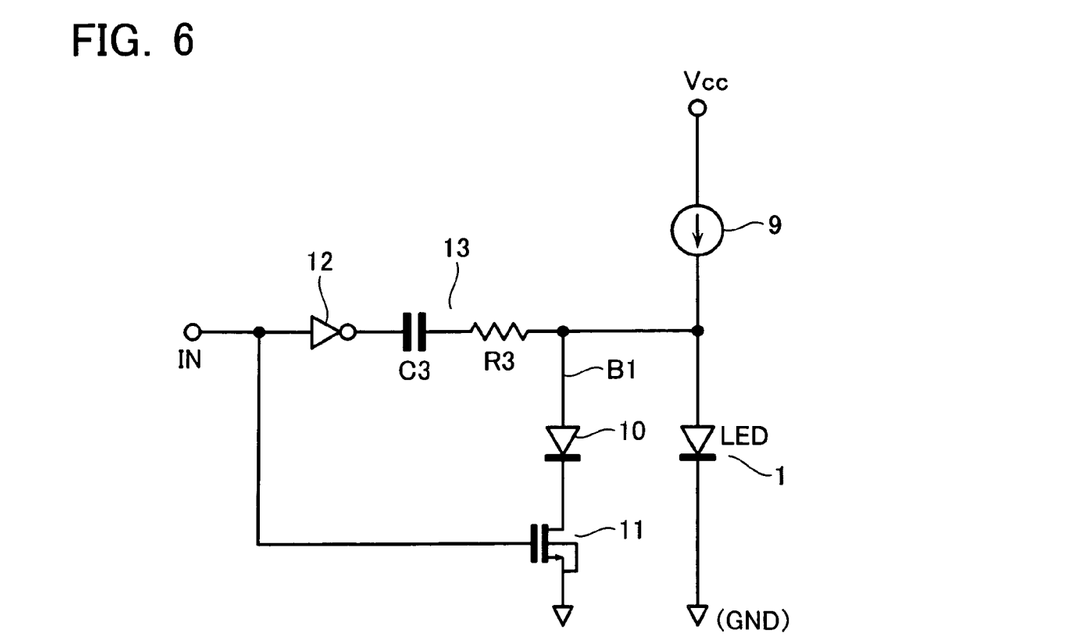
FIG. 6 shows a configuration of a light-emitting element driving circuit according to a second embodiment of the present invention.
Figure 7:
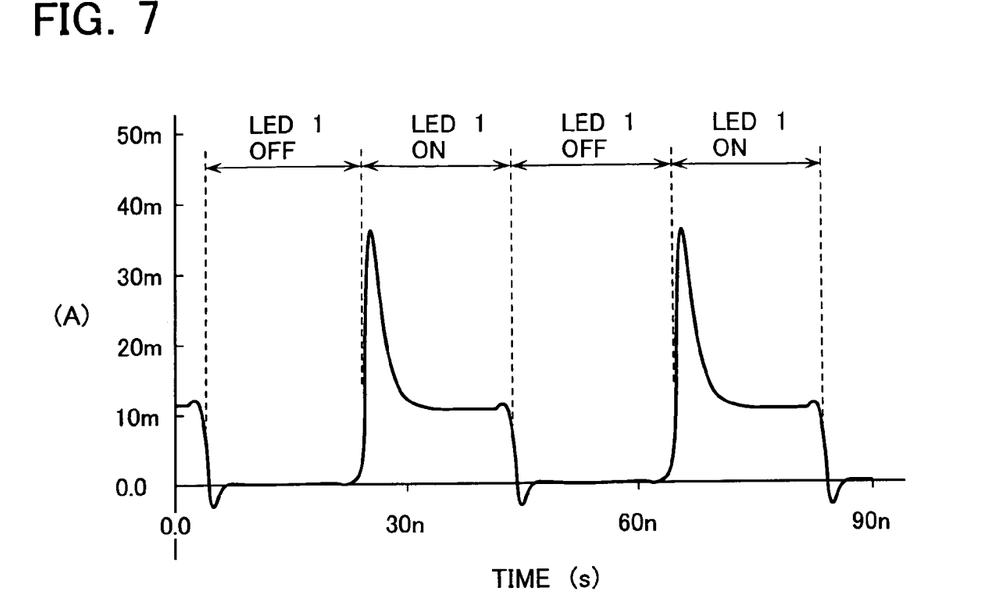
FIG. 7 is a graph showing operation of the light-emitting element driving circuit according to the first embodiment (variations in current)

In the light-emitting element driving circuit of FIG. 6, the constant current source 9 may be replaced with a resistor, needless to say. The resistor R3 is employed to adjust an amount of over drive and thus may be omitted.

Figure 8:
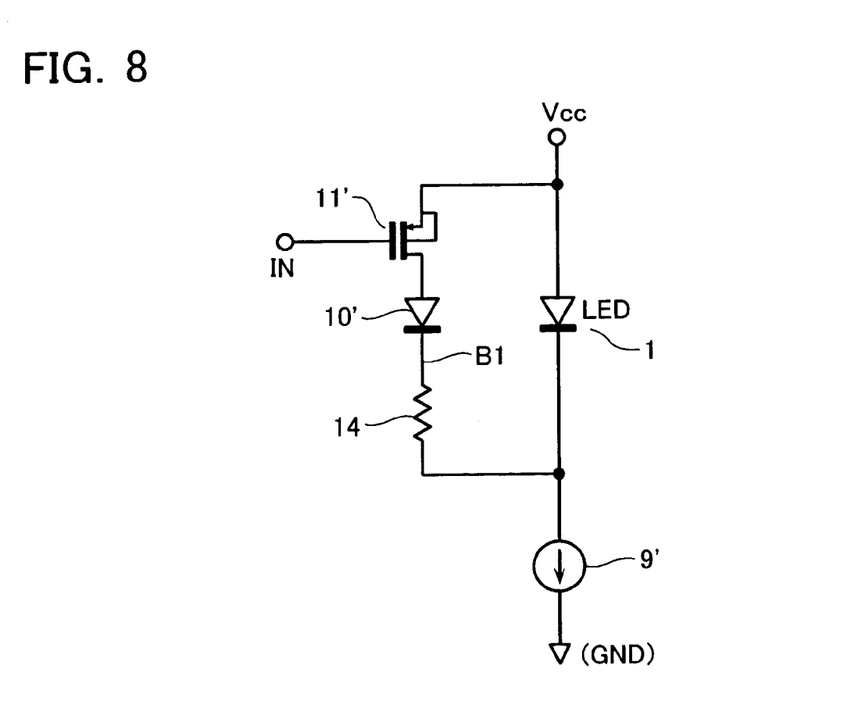
FIG. 8 shows a configuration of a light-emitting element driving circuit according to a third embodiment of the present invention.

A third embodiment of the present invention is described with reference to FIG. 8.

Figure 9:
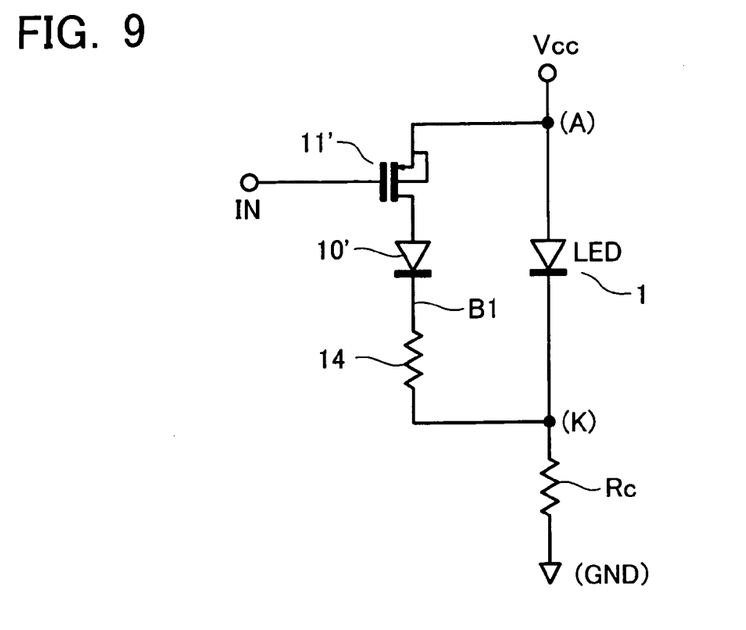
FIG. 9 shows an alternative of the third embodiment.

This embodiment is different from the first and second embodiments in that the anode (A) of the LED 1 is connected to the terminal for the supply voltage Vcc while the cathode (K) is connected to a constant current source 9'. It is coincident with the first and second embodiments in that the current path B1 is formed in parallel with the LED 1 and that the voltage drop across the whole current path B1 is determined smaller than the forward voltage Vf of the LED 1 emitting light. This embodiment is also different from the first and second embodiments in the current path B1, in which a PMOS transistor 11' is employed instead of the NMOS transistor as the semiconductor switching element, and in which a resistor 14 is connected serially to a diode 10'. The resistor 14 has a role to adjust the magnitude of the voltage drop across the current path B1. The PMOS transistor 11' may be replaced with an NMOS transistor like the above embodiments. In addition, the constant current source 9' may be replaced with a resistor Rc as shown in FIG. 9.

Operation of the light-emitting element driving circuit according to the third embodiment is almost similar to that of the driving circuit of the first embodiment. Namely, when the input signal IN is set "Hi" to make the PMOS transistor 11' non-conductive, the current from the constant current source 9' flows through the LED 1, which emits light. When the input signal IN is set "Low" to make the PMOS transistor 11' conductive, the current from the constant current source 9' flows in the current path B1, that is, the PMOS transistor 11', the diode 10' and the resistor 14. As the voltage drop across the whole current path B1 is determined smaller than the forward voltage Vf of the LED 1 emitting light, the LED 1 turns off.

Either when the LED 1 turns on or when it turns off, the anode potential and the cathode potential on the diode 10' fluctuate almost similar to the graph shown in FIG. 3. Therefore, the forward voltage is always applied across the diode 10' to prevent possible destruction of the diode 10' due to the reverse voltage that exceeds the breakdown voltage.

Figure 10:
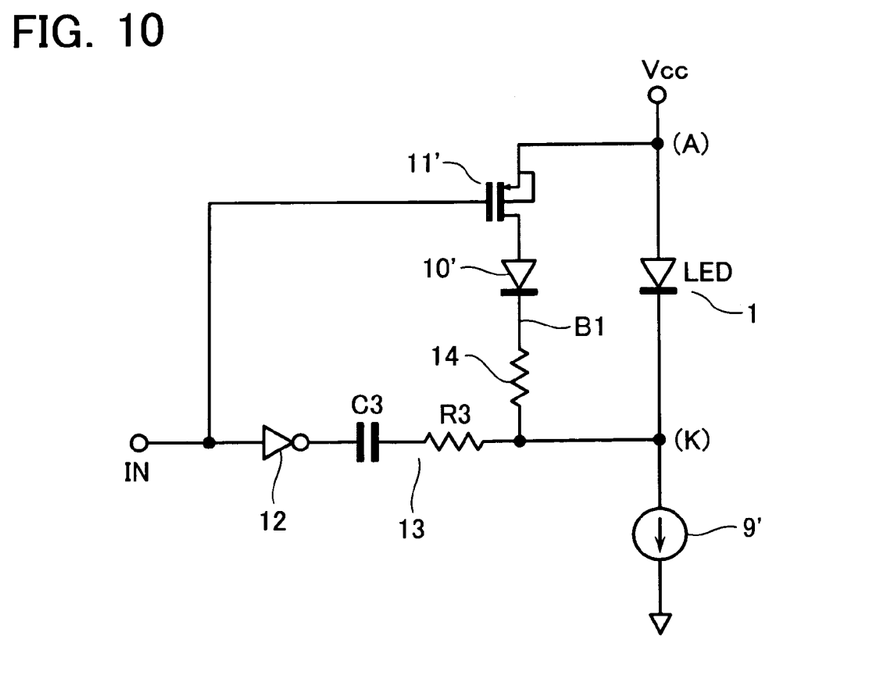
FIG. 10 shows a configuration of a light-emitting element driving circuit according to a fourth embodiment of the present invention.

A fourth embodiment of the present invention is described with reference to FIG. 10. This embodiment further includes the inverter 12 and the peaking circuit 13 connected between the terminal for the input signal IN and the cathode (K) of the LED 1 in addition to the configuration of the third embodiment.

Operation of the light-emitting element driving circuit of the fourth embodiment is described below.

When the input signal IN to the inverter 12 is turned from "Low" to "Hi" (the output signal is changed from "Hi" to "Low") to turn the PMOS transistor 11' from conductive to non-conductive, the current from the constant current source 9' flows in the LED 1. As a result, the LED 1 transfers the state from light elimination to light emission. In this case, the current from the supply voltage (Vcc) is drained in the capacitor C3 of the peaking circuit 13 via the LED 1. As a result, a negative peaking current having a waveform of the signal output from the inverter 12 and differentiated flows and is superimposed on the current drained in the constant current source 9'. Thus, the LED 1 can be over driven to switch the state from light elimination to light emission quickly.

On the other hand, when the input signal IN to the inverter 12 is turned from "Hi" to "Low" (the output signal is changed from "Low" to "Hi") while the LED 1 emits light, the PMOS transistor 11' is turned from non-conductive to conductive. In this case, the current from the constant current source 9' flows in the current path B1, that is, the diode 10' and the PMOS transistor 11' to change the state of the LED 1 from light emission to light elimination.

Figure 11:
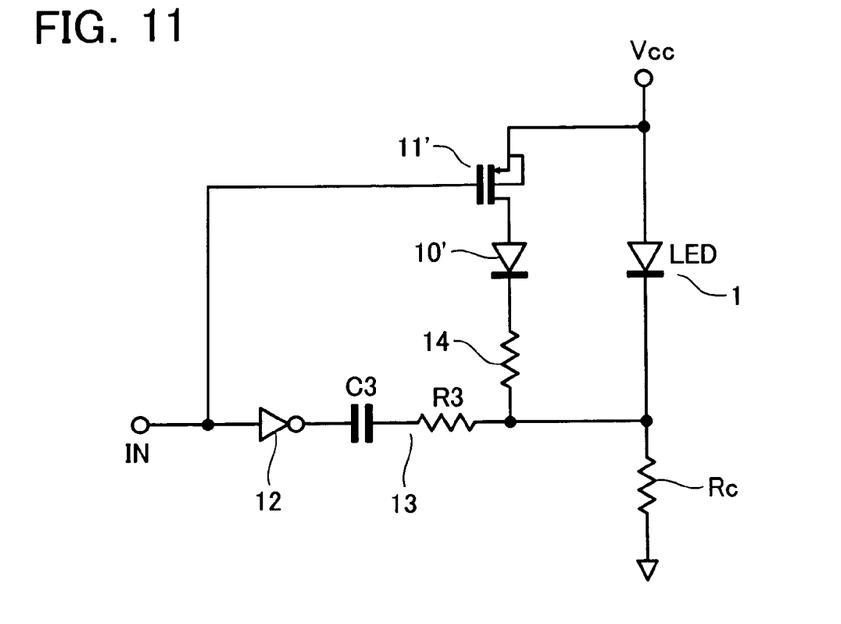
FIG. 11 shows an alternative of the fourth embodiment.

After the LED 1 changes the state from light emission to light elimination, the charge accumulated in the capacitor C3 of the peaking circuit 13 is discharged toward the cathode of the LED 1. As a result, a peaking current having a waveform of the signal output from the inverter 12 and differentiated flows to discharge the internal charge accumulated in the capacitance of the LED 1. At the same time, an improved time can be achieved for draining the current in the constant current source 9' via the current path B1, that is, the diode 10' and the PMOS transistor 11'. Thus, the LED 1 can be over driven to switch the state from light emission to light elimination quickly. In the light-emitting element driving circuit of FIG. 10, the constant current source 9' may be replaced with a resistor Rc as shown in FIG. 11, needless to say. The resistor R3 may be omitted like the second embodiment.

The invention has been described on the embodiments above though the present invention is not limited to these embodiments. Rather, various modifications, additions and replacements can be devised without departing from the scope and spirit of the invention.

What is claimed is:

1. A light-emitting element driving circuit, comprising:
   a current supplier serially connectable to a light-emitting element and operative to supply a current to said light-emitting element; and
   a switching unit operative to control switching between the states of said current supplied to said light-emitting element from said current supplier,
   said switching unit including a current path comprising a diode and a semiconductor switching element, said diode being connected in parallel with said light-emitting element and in a forward direction directed from an anode to a cathode of said light-emitting element, said semiconductor switching element being connected serially to said diode and operative to switch between the states of conductive and non-conductive based on a control signal,
   wherein a voltage drop across said current path when said semiconductor switching element is made conductive is lower than a forward voltage of said light-emitting element when it emits light.

2. The light-emitting element driving circuit according to claim 1, wherein said current supplier is connected to said anode of said light-emitting element, said cathode of said light-emitting element being grounded.

3. The light-emitting element driving circuit according to claim 2, said semiconductor switching element is an N-channel MIS transistor.

4. The light-emitting element driving circuit according to claim 1, wherein said current supplier is connected to said cathode of said light-emitting element, said anode of said light-emitting element being connected to a supply voltage.

5. The light-emitting element driving circuit according to claim 4, said semiconductor switching element is a P-channel MIS transistor.

6. The light-emitting element driving circuit according to claim 1, wherein said current supplier comprises a constant current source.

7. The light-emitting element driving circuit according to claim 1, wherein said current supplier comprises a resistor having both ends, across which a certain voltage is applied.

8. The light-emitting element driving circuit according to claim 1, further comprising a peaking circuit operative to supply a peaking current flowing in said light-emitting element in said forward direction for a certain period of time on receipt of a signal for making said semiconductor switching element non-conductive,
   said peaking circuit supplying a peaking current flowing in said light-emitting element in the reverse direction of said forward direction for a certain period of time on receipt of a signal for making said semiconductor switching element conductive.

9. The light-emitting element driving circuit according to claim 8, wherein said peaking circuit includes a capacitor.

10. The light-emitting element driving circuit according to claim 8, wherein said peaking circuit includes a capacitor and a resistor serially connected thereto.

11. The light-emitting element driving circuit according to claim 8, wherein said peaking circuit is configured to connect in parallel with said current path when said semiconductor switching element is made conductive.

12. The light-emitting element driving circuit according to claim 1, wherein said diode comprises a single diode element, and wherein said light-emitting element and said diode are composed of the same material.

13. The light-emitting element driving circuit according to claim 9, wherein an inverted signal of said control signal is fed to one end of said capacitor.

14. The light-emitting element driving circuit according to claim 13, wherein said current supplier is connected to said anode of said light-emitting element, said cathode of said light-emitting element being grounded.

15. The light-emitting element driving circuit according to claim 14, wherein said semiconductor switching element comprises an N-channel MIS transistor.

16. The light-emitting element driving circuit according to claim 13, wherein said current supplier is connected to said cathode of said light-emitting element, said anode of said light-emitting element being connected to a supply voltage.

17. The light-emitting element driving circuit according to claim 16, wherein said semiconductor switching element comprises a P-channel MIS transistor.

* * * * *